(12) United States Patent
Everett et al.

(10) Patent No.: US 7,156,115 B2
(45) Date of Patent: Jan. 2, 2007

(54) METHOD AND APPARATUS FOR FLOW CONTROL

(75) Inventors: William F. Everett, Goshen, IN (US); David C. Sudolcan, Atascosa, TX (US)

(73) Assignee: Lancer Partnership, Ltd

( * ) Notice: Subject to any disclaimer, the term of this patent is extended or adjusted under 35 U.S.C. 154(b) by 232 days.

(21) Appl. No.: 10/680,588

(22) Filed: Oct. 7, 2003

(65) Prior Publication Data
US 2004/0144423 A1   Jul. 29, 2004

Related U.S. Application Data

(63) Continuation-in-part of application No. 10/351,673, filed on Jan. 28, 2003, now abandoned.

(51) Int. Cl.
*G05D 11/13* (2006.01)
*B67D 5/56* (2006.01)

(52) U.S. Cl. ............... 137/3; 137/98; 137/87.03; 137/101.19; 222/54; 222/71; 222/129.4; 700/283; 700/285

(58) Field of Classification Search ......... 137/87.03, 137/98, 101.19, 3; 222/54, 71, 129.4; 700/239, 700/240, 283, 285
See application file for complete search history.

(56) References Cited

U.S. PATENT DOCUMENTS

| | | | |
|---|---|---|---|
| 4,007,880 A | 2/1977 | Hans et al. | |
| 4,206,781 A | 6/1980 | Salter | |
| 4,226,344 A | 10/1980 | Booth et al. | |
| 4,342,443 A | 8/1982 | Wakeman | |
| 4,487,333 A * | 12/1984 | Pounder et al. ........... | 222/54 |
| 4,615,358 A | 10/1986 | Hammond et al. | |
| 4,623,118 A | 11/1986 | Kumar | |
| 4,624,282 A | 11/1986 | Fargo | |
| 4,662,605 A | 5/1987 | Garcia | |
| 4,711,379 A | 12/1987 | Price | |
| RE32,644 E | 4/1988 | Brundage et al. | |
| 4,790,345 A | 12/1988 | Kolchinsky | |
| 4,884,720 A | 12/1989 | Whigham et al. | |
| 4,889,148 A | 12/1989 | Smazik | |
| 4,890,774 A * | 1/1990 | Poore ........................ | 222/640 |
| 4,979,639 A | 12/1990 | Hoover et al. | |
| 5,011,043 A | 4/1991 | Whigham et al. | |
| 5,011,113 A | 4/1991 | Stobbs et al. | |
| 5,071,038 A | 12/1991 | Credle, Jr. | |
| 5,117,869 A | 6/1992 | Kolchinsky | |
| 5,121,855 A | 6/1992 | Credle, Jr. | |
| 5,178,359 A | 1/1993 | Stobbs et al. | |
| 5,179,970 A | 1/1993 | Jarocki et al. | |
| 5,181,534 A | 1/1993 | Hashida et al. | |
| 5,192,000 A * | 3/1993 | Wandrick et al. ........... | 222/59 |
| 5,299,715 A | 4/1994 | Feldman | |
| 5,381,926 A * | 1/1995 | Credle et al. ............. | 222/1 |
| 5,509,637 A | 4/1996 | Leonard | |
| 5,656,313 A * | 8/1997 | Gibney et al. ............ | 426/231 |
| 5,716,038 A | 2/1998 | Scarffe | |
| 5,730,324 A * | 3/1998 | Shannon et al. ........... | 222/61 |
| 5,842,603 A | 12/1998 | Schroeder et al. | |
| 5,868,164 A | 2/1999 | Haskett | |
| 6,036,167 A | 3/2000 | Wade | |

(Continued)

*Primary Examiner*—Ramesh Krishnamurthy

(57) ABSTRACT

A flow control system (10) is provided in which a flow control valve (12) is controlled by a control system (14). The control system (14) measures a flow rate or temperature of a fluid flowing through the flow control valve (12) and adjusts the flow control valve (12) to achieve a desired flow rate. The flow control valve (12) includes an electromagnetically adjustable spool (26).

23 Claims, 2 Drawing Sheets

U.S. PATENT DOCUMENTS

| | | |
|---|---|---|
| 6,155,654 A | 12/2000 | Oyama |
| 6,161,572 A | 12/2000 | Credle et al. |
| 6,198,369 B1 | 3/2001 | Ward et al. |
| 6,279,777 B1 | 8/2001 | Goodin et al. |
| 6,286,566 B1 | 9/2001 | Cline et al. |
| 6,318,599 B1 | 11/2001 | Estelle et al. |
| 6,328,181 B1 | 12/2001 | Schroeder et al. |
| 6,374,845 B1 * | 4/2002 | Melendez et al. ............ 137/3 |
| 6,374,856 B1 | 4/2002 | Nitsche |
| 6,390,129 B1 | 5/2002 | Jansen et al. |
| 2001/0011660 A1 | 8/2001 | Schroeder et al. |
| 2001/0023876 A1 | 9/2001 | Estelle et al. |
| 2001/0023880 A1 | 9/2001 | Estelle et al. |
| 2001/0023881 A1 | 9/2001 | Magri |
| 2002/0014496 A1 | 2/2002 | Cline et al. |
| 2002/0060226 A1 | 5/2002 | Kameyama |
| 2002/0060228 A1 | 5/2002 | Nicol |

\* cited by examiner

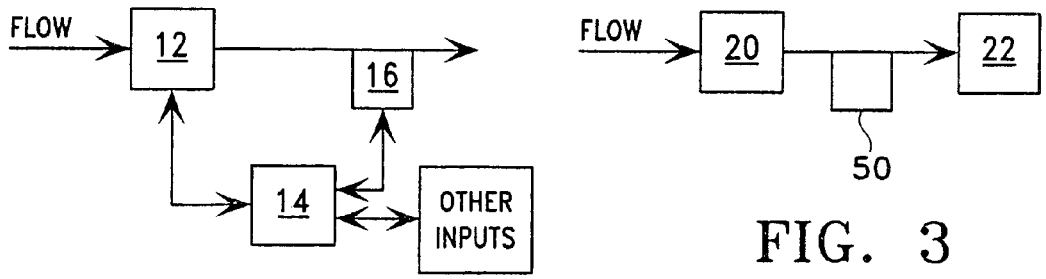
FIG. 1
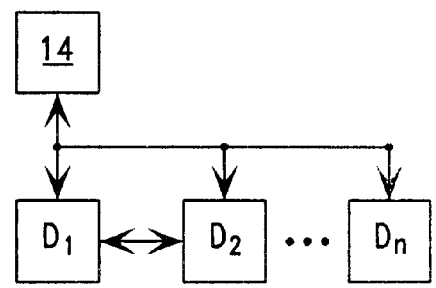
FIG. 3
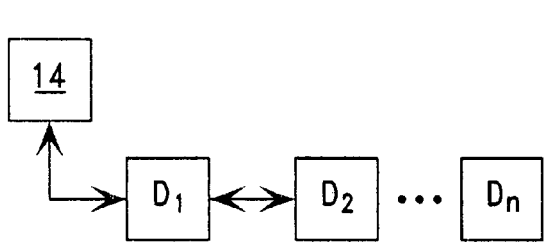
FIG. 4A
FIG. 4B
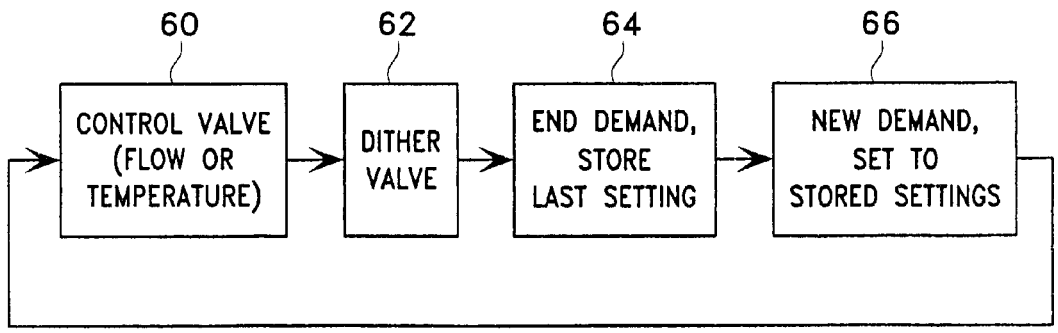
FIG. 5

METHOD AND APPARATUS FOR FLOW CONTROL

RELATED APPLICATION INFORMATION

This application is a continuation-in-part of U.S. patent application Ser. No. 10/351,673, filed Jan. 28, 2003 now abandoned, entitled Electromagnetically Actuated Proportional Flow System.

TECHNICAL FIELD OF THE INVENTION

This invention relates generally to flow control.

BACKGROUND OF THE INVENTION

Control of the flow of one or more liquids is desirable in many applications. For example, without limitation, where liquids are to be mixed in particular proportions, or where particular amounts of liquids are desired, it is often desirable to control the flow rates to ensure the proper mixture or amount. Typically, as part of this control, a sensor is used to measure flow rate, and a control device, such as a valve, is adjusted in response to the sensed flow rate to achieve the desired flow rate.

A particular application where flow control is desirable is in the dispensing of post-mix beverages. In post-mix beverage systems, beverage syrups and/or flavors are mixed with carbonated or plain water to form finished beverages. In such systems, drink quality is significantly affected by the accuracy of the mixture ratio of these liquids. However, due to variations in the systems, such as, without limitation, pressure changes, temperature changes, drift, and wear issues, flow rates in such systems are not constant. Therefore, it is desirable to control the rate of flow of one or more of the liquids to insure proper mixture ratios.

While systems have been employed to control flows, there is an ever present need to improve their cost, efficiency, and accuracy.

SUMMARY OF THE INVENTION

In accordance with the teachings of the present invention, systems and methods for flow control are provided which eliminate or substantially reduce the problems associated with prior art systems.

In particular, a flow control system is provided in which a first fluid flows at a first fluid flow rate. Also provided is a flow control valve through which a second fluid flows, the flow control valve having a coil and a spool, such that an electric current flowing through the coil generates an electromagnetic force on the spool. A sensor is operable to sense a parameter of the second fluid, such as temperature or flow rate, and a control system is coupled to the sensor and the coil. The control system is operable to determine a desired flow rate of the second fluid based on the first fluid flow rate, and further operable to adjust the electromagnetic force on the spool based on the sensed parameter to achieve the desired flow rate. In some embodiments, the first fluid flow rate may be measured, calculated, or simply assumed.

In one embodiment, the control system remembers a setting of the electric current, and applies the remembered setting or holds the remembered setting for some time. In a particular embodiment, the remembered setting is the last setting used during a previous demand for the second fluid.

Particular applications of the present invention involve beverage dispensing, wherein the first fluid is water (carbonated or plain), and the second fluid is a beverage syrup. Similarly, the first fluid may be a beverage syrup, and the second fluid plain or carbonated water.

The system may further include a shut-off valve to stop flow of the second fluid. Also, the sensor may be located between the flow control valve and the shut-off valve. In one embodiment, the flow control valve, the shut-off valve, and the sensor are integrated.

The sensor may comprise most any temperature or fluid flow sensor, and in a particular embodiment is a single thermistor.

In particular embodiments, the control system controls a pulse width modulated signal to adjust the electromagnetic force on the spool.

Also provided is a beverage dispensing system having a plurality of flow control valves, each of the flow control valves having a coil and a spool such that an electric current flowing through a respective coil generates an electromagnetic force on a respective spool. Also provided are a plurality of sensors each operable to measure a parameter of the respective fluid flowing through a respective flow control valve, and a control system coupled to the sensors and coils. The control system is operable to determine desired flow rates through the flow control valves, and to adjust the electromagnetic force on a respective spool based on the sensed parameter through the respective flow control valve to achieve the desired flow rate through that flow control valve.

In a particular embodiment, the sensors and coils are coupled directly to the control system. In another embodiment, the flow control valves are connected to the control system via a communication bus.

Also provided is a method of operating a flow control system that involves determining a fluid flow rate of a first fluid, sensing a parameter (such as flow rate or temperature) of a second fluid, determining a desired flow rate for the second fluid based on the fluid flow rate of the first fluid, and setting the flow rate of the second fluid based on the sensed parameter of the second fluid to achieve the desired flow rate. Setting the flow rate comprises adjusting the position of a spool by adjusting an electromagnetic force on the spool. In a particular embodiment, adjusting the electromagnetic force comprises adjusting a pulse width modulated signal sent through a coil. In some embodiments, the first fluid rate may be assumed, calculated, or measured.

In still another embodiment, the spool or spools may be dithered.

In another embodiment of a method, a control setting is remembered, and at least part of setting the flow rate comprises applying the remembered control setting or holding the remembered control setting for some time. In one embodiment, the remembered control setting is a last control setting used during a previous demand for the second fluid.

One technical advantage, among others, of the present invention is the effectiveness of the adjustable flow control valve.

BRIEF DESCRIPTION OF THE DRAWINGS

Reference is made in the description to the following briefly described drawings:

FIG. 1 is a block diagram of one embodiment of a closed loop fluid control system according to the teachings of the present invention;

FIG. 3 is a block diagram of one embodiment of a component arrangement according to the teachings of the present invention;

FIGS. 4A and 4B are block diagrams of particular embodiments of control approaches according to the teachings of the present invention; and FIG. 5 is a flow diagram of one embodiment of a method of operating a fluid control system according to the teachings of the present invention.

DETAILED DESCRIPTION OF THE INVENTION

Figure 2:
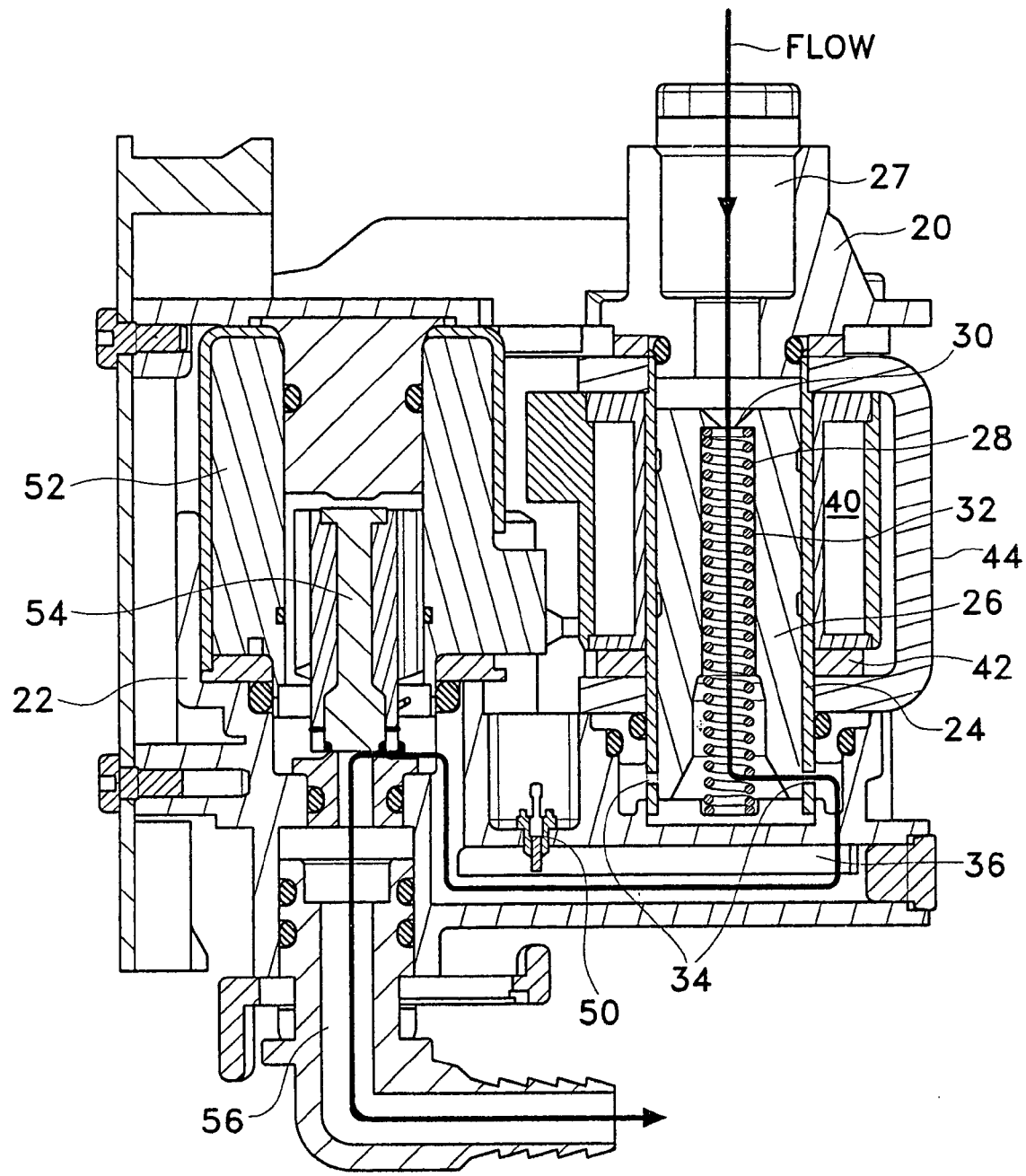
FIG. 2 is a sectional view of one embodiment of a valve according to the teachings of the present invention.

The present application is a continuation-in-part of U.S. patent application Ser. No. 10/351,673, filed Jan. 28, 2003, entitled "ELECTROMAGNETICALLY ACTUATED PROPORTIONAL FLOW SYSTEM," which is herein incorporated by reference in its entirety.

FIG. 1 is a block diagram of one embodiment of a flow control system 10 according to the teachings of the present invention. As shown in FIG. 1, a flow control valve 12 is coupled to a control system 14. Control system 14 is also coupled to a sensor 16. In the particular embodiment shown in FIG. 1, sensor 16 is shown downstream of the valve 12. However, it should be understood that the sensor 16 may be upstream or downstream, and may comprise one or more sensors upstream, downstream or both.

FIG. 2 illustrates a sectional view of a particular embodiment of the valve 12. The valve 12 includes a flow control solenoid valve 20 and a shut-off valve 22. In the particular configuration shown in FIG. 2, fluid flows first through the valve 20 and then through the shut-off valve 22. However, it should be understood that other arrangements may be used, for example, without limitation, in which a shut-off valve is upstream of the flow control valve or in which no shut-off valve is used. While no shut-off valve is needed, it is advantageous to use a normally closed shut-off valve to insure no flow in loss of power or other failure mode conditions.

The valve 20 includes a sleeve 24 with a spool 26 slidably mounted therein as a fluid flow regulator. A fluid inlet port 27 communicates fluid through a fluid passageway 28 of spool 26. The inlet side of spool 26 includes a restrictor orifice 30 through which fluid passes from the inlet port 27 into the fluid passageway 28. In many applications, such as beverage dispensing, the controlled fluids may be considered to substantially incompressible, and therefore the amount of fluid passing through orifice 30 is proportional to the differential pressure across the orifice 30 as defined by Bernoulli's Law.

Sleeve 24 includes holes 34 that allow fluid to pass from the passageway 28 to an outlet passage 36. A spring 32 applies a balancing force to the spool 26, opposing the force created by the fluid flow on spool 26 entering from the port 27. The differential pressure across the spool 26 is defined as the input pressure of port 27 minus the outlet pressure in outlet passageway 36. If the differential pressure across spool 26 increases, the spool 26 is urged against the spring pressure and the electromagnetic force to be discussed below. As the spool 26 is so urged (downward in the orientation shown in FIG. 2) by the increasing differential fluid pressure, the holes 34 begin to close off, and fluid flow out of the valve 20 is thereby reduced, subsequently reducing the flow through orifice 30. This action restores the force balance on the spool, therefore maintaining a substantially constant flow through orifice 30, substantially independent of inlet or outlet pressures. Conversely, if the differential pressure is reduced, the spool 26 moves upward, thus opening the holes 34 more widely and increasing the flow out of the valve 20, subsequently increasing the flow through orifice 30, and therefore maintaining a substantially constant flow through orifice 30, substantially independent of inlet or outlet pressures.

A wire coil 40 is mounted about sleeve 24. Also provided is a washer 42 and bracket 44. Bracket 44 is mounted about sleeve 24 and contains coil 40 and washer 42. Washer 42 and bracket 44 are made from magnetic metal alloy so as to complete a magnetic circuit. Spool 26 is preferably formed from a material of magnetic quality, such as 430 stainless steel, although other materials may be used as well. Sleeve 24 is preferably formed from a non-magnetic material such as a ceramic, although other materials may also be used.

In operation, electric current is applied to the coil 40 under control of the control system 14, and an electromagnetic field is imparted on spool 26. The force from this field urges the spool 26 against the differential pressure of the incoming fluid. In the orientation shown in FIG. 2 the spool 26 is urged upward by the electromagnetic field. Thus, by increasing the current, the force on the spool is increased, and the holes 34 are opened more fully, allowing more flow through the valve 20, thus increasing the differential pressure across orifice 30. By decreasing the current, the force on the spool is decreased, and the holes 34 become more closed, reducing flow through the valve 20, thus decreasing the differential pressure across orifice 30. Bernoulli's Law defines the relationship between differential pressure and flow through orifice 30. The term spool as used herein is meant to include any device, having any shape, that can be moved to vary the size of a flow path for a fluid.

In a preferred embodiment, the current applied to coil 40 is a pulsed electrical signal, and in particular is preferably a pulse width modulated ("PWM") electrical signal. In a particular example, the pulses are operated at frequencies of approximately 40 hertz, however, it should be understood that other frequencies may be used, and the frequency may vary as part of a control approach. With pulse width modulation, the higher the duty cycle of the PWM signal, the higher the flow through the valve. In this way, the flow through the valve may be controlled in response to measured flows. Although the preferred embodiment uses pulse width modulation, other control approaches may be used, including, without limitation, adjusting the amplitude of a continuous (unpulsed) current.

By using an alternating type current (such as a pulsed signal or alternating signal), one particular advantage of the present invention is achieved. This advantage is dithering of the spool 26. With dithered motion, the friction between the spool 26 and sleeve 24 is reduced (as the coefficient of kinetic friction is lower than the coefficient of static friction). It should be understood, however, that no dither action is needed.

In a preferred embodiment, the valve 20 includes the spring 32 discussed above. The spring 32 may be sized to bias the spool 26 and assist in flow regulation in combination with the electromagnetic control. However, the spring 32 may be eliminated altogether, in which case the electromagnetic control would serve alone to counteract the force of the differential pressure created by the fluid flow. Also, the spring 32 may be used simply to modify the damping ratio of the mechanical system to enhance transient response to changing inlet or outlet pressure perturbations, and improve dynamic response to electrical input signals.

Continuing with the description of FIG. 2, a sensor 50 is provided for measuring one or more parameters of the fluid that is flowing through the valve 12. In the particular embodiment shown, as also shown in block form in FIG. 3, such measurement is made between the valve 20 and the shut-off valve 22. This configuration is exemplary only, and the measurement may occur upstream of valve 12, downstream of the valve 12, or any combination of upstream, downstream, or in-between measurement.

A particular sensor that may be used for sensor 50 is a single thermistor mass flow sensor. U.S. patent application Ser. No. 10/625,841, filed Jul. 23, 2003, entitled "A METHOD AND APPARATUS FOR DETERMINING FLOW RATE OF A FLUID," which is herein incorporated by reference in its entirety, describes the operation of a particular embodiment of a single thermistor mass flow sensor. However, it should be understood that other mass flow sensors may be used, including, without limitation, thermistor sensors that use more than one thermistor, paddle wheel flow measurement devices, differential pressure flow sensors, or any other flow sensor. Moreover, as will be discussed below, the sensor 50 may also comprise simply a temperature sensor, or a temperature sensor in combination with, or that also may be used as, a mass flow sensor. Also, the control system generally converts a signal from the physical sensor into usable data, and the concepts of sensor or measurement are meant to include the physical sensor alone or in combination with whatever other components assist in turning the sensor signal into usable data or signals.

The sensor, as discussed above in connection with FIG. 1, communicates with the control system 14, which in turn controls the electromagnetic field of the valve 20 to thereby control flow to the desired rate. The control system 14 may also receive input from other flow sensors, or use other data or inputs, to determine the desired flow rate. In particular, the control system 14 makes a determination (based on, for example, other sensors or internal data or other input) as to the desired flow rate through the valve 12. The control system 14 measures the actual flow through the valve 12, or some other parameter of the fluid flowing through the valve 12, and adjusts the position of the spool 26 until the desired flow rate is achieved.

Shut-off valve 22 is also provided, and in a particular example shown is a solenoid shut-off valve. The shut-off valve 22 is normally closed, thus insuring no flow in power loss or other failure modes. When flow is desired, a solenoid coil 52 is energized to move the solenoid core 54 to an open position, thereby allowing flow of fluid from passage 36 to outlet passage 56. Although the particular embodiment shown is a normally closed solenoid valve, it should be understood that any shut-off valve may be used without departing from the intended scope of the present invention. Indeed, no shut-off valve is required.

Although valve 12 is shown with an integrated flow control valve 20, shut-off valve 22, and flow sensor 50, it should be understood that no such integration is needed. One or more of these components may be omitted, or formed as separate units without departing from the intended scope of the present invention. At times in this description, the terms "flow control valve" or "valve" are used, and are not meant in a limiting sense, and refer to either or both an integrated valve 12 such as that shown in FIG. 2 or just the flow control valve 20, or to any combination of the control valve, shut-off valve, and sensor.

Following are examples of operation of the system 10 in connection with a beverage dispensing application. However, it should be understood that the invention has application in other areas, and even in beverage dispensing other approaches may be used, and these examples are illustrative only. In the first example, the control system 14 is used to measure the flow of water (carbonated or plain water), for example by communicating with a water flow sensor. The water may be flowing through a flow control valve such as that described herein, through some other flow control valve, or simply through a shut-off valve. Based on the water flow measurement, the control system 14 determines the appropriate flow rate for a beverage syrup to be mixed with the water, based on the desired mixture ratio of the water and that syrup. The beverage syrup flows through a flow control valve such as that described herein, and the control system 14 measures (using the sensor 50) the actual flow of the beverage syrup. The control system 14 compares the actual syrup flow rate to the desired flow rate, and adjusts the syrup control valve until the desired syrup flow rate is achieved. In this example, syrup flow is controlled based on water flow. Of course, water flow may be controlled based on syrup flow. Furthermore, the control system may be designed to assume or calculate a flow rate for a first fluid (i.e., not actually measure the first fluid's flow rate), and control another fluid based on the flow rate of the first.

In another example of operation, the sensor 50 (or some other sensor) may be used to measure the temperature of the fluid flowing through the control valve. Based on this temperature measurement, the control system 14 sets the valve, for example and without limitation, by using a look up table or by calculations, to a setting that provides the desired flow rate for that temperature. As discussed elsewhere, the desired flow rate may be determined, for example and without limitation, by measuring, calculating, or assuming another fluid's flow rate that is to be mixed with the fluid that is flowing through the control valve. To establish the look up table or algorithm for correlating a temperature to a flow setting, data is gathered from characterization testing of the valve. With this temperature based example, actual flow measurement may also be used to confirm that the expected flow rates correspond to actual flow rates. If they do not, then the control system 14 applies a scaling factor to the look up table or algorithm to adjust for actual measured flows. The desirability of such a scaling factor may arise, for example and without limitation, over time if the valve or other parts of the system wear or drift from their initial condition. With the temperature based approach of this example, actual mass flow measurement need not be used at all, or, if it is used, it may be accomplished with a less expensive, slower responding sensor, as it need only be used to ensure long term accuracy of the valve, and need not be relied upon for immediate control of the valve. These confirmatory measurements may be made during relatively long flow cycles. Moreover, the flow sensor and the temperature sensor may be the same sensor (such as, without limitation, one or more thermistors).

The control system 14 may be remote from the valve, or it may local to the valve, such as on a printed circuit board incorporated as part of the valve assembly. Furthermore, the control system 14 may be distributed, such that a central controller communicates with a local control, wherein the local control is local to the valve. Furthermore, the control system 14 may be coupled to other sensors, devices, and data to accomplish its control. As shown in FIGS. 4A and 4B, control system 14 may be coupled to a series of devices (such as flow control valves and/or other devices) through a communications bus coupled between each device (sometimes called a daisy chain), or directly to each device (for example, through dedicated lines or a communications bus). Using a communications bus is advantageous in systems such as beverage dispensing systems, wherein several valves and sensors may be in close proximity to one another, as wiring lengths and issues can be minimized. The control system 14 may comprise, without limitation, a microcontroller or microprocessor based control system. Moreover, the control system may comprise a system such as that described in U.S. Provisional Application No. 60/474,588, filed May 30, 2003, and entitled "DISTRIBUTED ARCHITECTURE FOR FOOD AND BEVERAGE DISPENSERS," which is herein incorporated by reference in its entirety.

FIG. 5 illustrates a flow diagram of one method of operating the valve 12 according to the teachings of the present invention. As shown in FIG. 5, at block 60, the valve is controlled in response to flow or temperature measurements, for example, without limitation, as has been described above. It should be understood that the controlling of the valve 12 occurs when there is a demand for flow. For example, in an application such as a beverage dispensing, the control of the flow will occur when there is a demand for a drink. Generally, the demand for a drink is signaled when a customer or operator presses a button or actuates a lever. After the demand for the fluid ceases (represented at block 64 discussed below), the shut-off valve is shut off, and obviously there is no flow to control. Block 62 represents the dithering of the valve 12 so as to reduce friction between the spool 26 and sleeve 24, which may occur, for example, as part of a PWM control of the valve. Although dithering is preferred, it is not required as part of the present invention.

Another aspect of the present invention is illustrated in block 64, wherein a demand cycle is ended and the control system remembers (e.g., stores) the last setting (or close to the last setting) of the valve used at the end of the demand cycle. For example, without limitation, with a PWM control approach, the frequency and duty cycle settings used at the end of the demand cycle are stored. For the next demand cycle, shown at block 66, the valve is set to the remembered settings. After this initial setting of the valve, it is controlled at block 60.

The memory feature discussed in connection with block 64 and 66, although not required as part of the present invention, is useful in achieving proper flow rates in many cases. For example, it usually provides a very accurate initial flow rate for each new demand cycle, particularly when the time between demand cycles is relatively short, and parameters do not usually vary greatly. It also solves a problem of achieving the proper flow rate when brief demands for fluid are presented. For example, in beverage dispensing applications, consumers or dispenser operators often "top off" a cup with additional fluid after initial filling. This often occurs after foam has subsided and there is room in the cup for more liquid. These brief "top offs" may not provide sufficient time for flow or temperature measurement and adjustment of the flow rate. Thus, by remembering the last setting, a very accurate flow rate and mixture can be achieved, because these "top off" situations generally occur shortly after longer flowing operations, and thus temperatures, viscosities and other parameters have not had time to vary greatly from the last operation, and the remembered settings are likely very close to the desired settings.

When demand ceases or some time thereafter, the valve spool may be moved to a rest position (for example, without limitation, by turning off current flow to the coil), and then, when demand arises again, reset based on the remembered electrical signal. Alternatively, the valve spool may be dithered around or held at its last controlled position until the next demand for fluid, or for some period of time.

With the present invention, significant advantages over prior art systems are provided. For example, appropriate flow rates can be achieved as temperatures change, viscosities change, parts wear, inlet and back pressures change, densities change, or other parameters change.

The particular embodiments and descriptions provided herein are illustrative examples only, and features and advantages of each example may be interchanged with, or added to the features and advantages in the other embodiments and examples herein. Moreover, as examples, they are not meant to limit the scope of the present invention to any particular described detail, and the scope of the invention is meant to be broader than any example. And, in general, although the present invention has been described in detail, it should be understood that various changes, alterations, substitutions, additions and modifications can be made without departing from the intended scope of the invention, as defined in the following claims.

What is claimed is:

1. A flow control system, comprising:
a first fluid flowing at a first fluid flow rate;
a flow control valve through which a second fluid flows, the flow control valve having a coil and a spool, such that an electric current flowing through the coil generates an electromagnetic force on the spool;
a temperature sensor operable to sense a temperature of the second fluid;
a control system coupled to the temperature sensor and the coil, the control system operable to determine a desired flow rate of the second fluid based on the first fluid flow rate;
a flow sensor coupled to the control system, the control system operable to determine a measured flow rate of the second fluid based on the flow sensor, the control system further operable to compare the measured flow rate of the second fluid to an expected flow rate of the second fluid and to establish a scaling factor based on the comparison of the measured and expected flow rates of the second fluid, such that the control system is operable to adjust the electromagnetic force on the spool based on the temperature of the second fluid and on the scaling factor to substantially achieve the desired flow rate of the second fluid.

2. The flow control system of claim 1, wherein the control system remembers a setting of the electric current from a previous demand for the second fluid, and wherein the control system applies the remembered setting or holds the remembered setting for some time.

3. The flow control system of claim 2, wherein the remembered setting is a last setting used during the previous demand for the second fluid.

4. The flow control system of claim 1, wherein the first fluid is water, and the second fluid is a beverage syrup.

5. The flow control system of claim 4, wherein the water is carbonated water.

6. The flow control system of claim 1, wherein the first fluid is a beverage syrup, and the second fluid is water.

7. The flow control system of claim 6, wherein the water is carbonated water.

8. The flow control system of claim 1, and further comprising a shut-off valve, the shut-off valve operable to stop flow of the second fluid.

9. The flow control system of claim 8, wherein the sensor is located between the flow control valve and the shut-off valve.

10. The flow control system of claim 8, wherein the flow control valve, the shut-off valve, and the sensor are integrated.

11. The flow control system of claim 1, wherein the temperature sensor is a single thermistor.

12. The flow control system of claim 1, wherein the control system controls a pulse width modulated signal to adjust the electromagnetic force on the spool.

13. The flow control system of claim 1, wherein the temperature sensor and the flow sensor are the same sensor.

14. The flow control system of claim 1, and further comprising a first fluid sensor coupled to the control system, the control system further operable to determine the first fluid flow rate based on the first fluid sensor.

15. The flow control system of claim 1, wherein the control system is operable to establish the scaling factor intermittently, and wherein the scaling factor is established during one or more relatively long flow cycles.

16. A method of operating a flow control system wherein there are a plurality of demands for flow separated by times when there is no demand for flow, comprising:
   determining a fluid flow rate of a first fluid;
   determining a desired flow rate for a second fluid based on the fluid flow rate of the first fluid;
   sensing a parameter of the second fluid;
   setting a flow rate of the second fluid with a control setting to substantially achieve the desired flow rate, wherein setting the flow rate comprises adjusting a position of a spool by adjusting an electromagnetic force on the spool, and wherein the control setting varies from a first control setting to a last control setting during a demand for flow; and
   establishing the control setting by remembering the last control setting from a previous demand for flow and applying said last control setting from said previous demand for flow as the first control setting in a subsequent demand for flow, and then varying the control setting based on the sensed parameter of the second fluid.

17. The method of claim 16, wherein adjusting the electromagnetic force comprises adjusting a pulse width modulated signal sent through a coil.

18. The method of claim 16, and further comprising dithering the spool.

19. The method of claim 16, wherein the sensed parameter is flow rate.

20. The method of claim 16, wherein the sensed parameter is temperature.

21. The method of claim 20, and further comprising measuring a flow rate of the second fluid, and wherein setting the flow rate of the second fluid is based on the sensed temperature and the measured flow rate.

22. The method of claim 16, wherein determining the fluid flow rate of the first fluid comprises assuming the fluid flow rate of the first fluid.

23. The method of claim 16, and further comprising:
   measuring a flow rate of the second fluid;
   comparing the measured flow rate of the second fluid to an expected flow rate of the second fluid; and
   establishing a scaling factor based on the comparison of the measured and expected flow rates of the second fluid, such that varying the control setting is further based on the scaling factor.

* * * * *